2,926,407
INCISION CLOSING CLIP

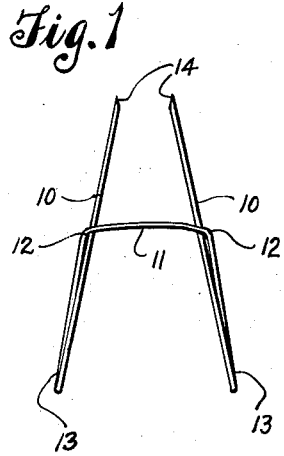
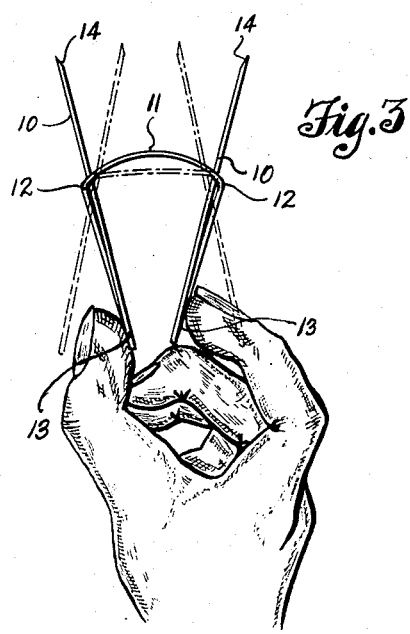
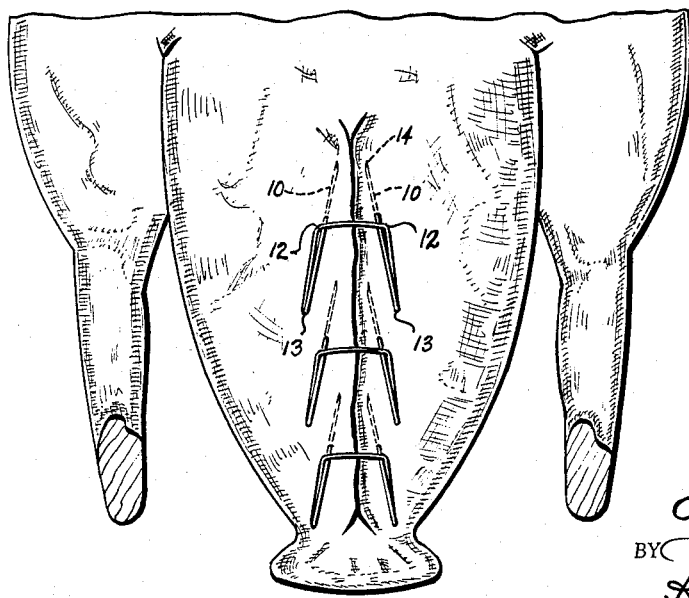
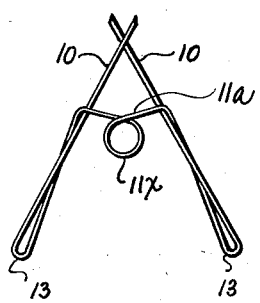
INVENTOR.
CHARLES F. CASSELL

Charles F. Cassell, Seattle, Wash., Jeannette C. Cassell, executrix of Charles F. Cassell, deceased, assignor to herself Application April 4, 1957, Serial No. 650,737

2 Claims. (Cl. 24—161)

This invention relates to incision closing means. More particular, it has reference to improvements in clips or stitching devices used for the closing of the incisions made in fowls such as chickens, geese or turkeys, which, after having been cleaned, are stuffed for baking.

It is the primary object of this invention to provide a spring clip that can be easily and readily opened for application to the fowl, across the incision and which upon being properly applied, will then operate to draw the flesh to close the incision.

A further object of the invention is to provide a clip that can be easily removed from the fowl merely by pulling it free.

Still another object of this invention is to provide a clip of the character and for the purposes above stated, from a single piece of spring steel wire bent to a specific form, and which can be repeatedly used.

In accomplishing the above and other objects of the present invention, I have provided the improved details of construction, the preferred forms of which are illustrated in the accompanying drawings, wherein:

Fig. 1 is a view of one of the present clips showing its leg portions in their normal converging relationship.

Fig. 2 is a side view of the present clip.

Fig. 3 illustrates the manner in which a clip is held between thumb and forefinger for the springing of the leg portions thereof to a diverging relationship for application to a fowl.

Fig. 4 is a view illustrating the mode of use of clips of the present character for the closing of an incision in a fowl.

Fig. 5 is a view similar to that of Fig. 1, but showing the clip in an alternative form.

Referring more in detail to the drawings:

The present clip is made from a single length of spring steel wire of small gauge. This wire is bent in such manner that its opposite end portions form two coextensive and opposedly related legs designated by numerals 10—10; these being joined in laterally spaced relationship by a transverse connector portion 11. In the finished clip this connector portion is located approximately midway of the inner and outer ends of the leg portions 10—10, and at its opposite ends it crosses therewith and is there formed with right angle bends, as at 12, 12, and then continues in the direction of the inner end portions of the legs and joins therewith in the loop-like bends 13—13. These two loop-like portions form finger holds for the easy holding and opening of the clip as illustrated in Fig. 3.

The normal position of the leg portions of the clip is as shown in Fig. 1 wherein it is observed that they are in spaced relationship and converge toward their outer ends which are sharpened, as at 14, for easier piercing of the skin or flesh of the fowl to which they may be applied. These loop-like portions 13—13 are flatwise relative to each other to afford the best possible finger hold on the clip.

It is important in the bending of the single piece of spring wire to form the clip, that the opposite end portions of the connector 11 shall cross over and engage with the top edge of the legs 10—10 as shown in Fig. 1, and that they shall then be directed downwardly across the outer sides of the legs as shown in Fig. 2 to join with the inner ends of the leg portions in the forming of the loops 13—13. Thus the bending of the opposite ends of the connector 11 provides stops or abutments at its ends which limit the spreading apart of the legs 10—10 under the incision closing force exerted by the clip, as presently will be explained.

Assuming that the clip is so formed, it is applied in use in the following manner: First, the user grips the loop-like end portion 13—13 between the thumb and forefinger of the hand as illustrated in Fig. 3 and pressed them together, thus springing the legs from their dotted line showing in Fig. 3 to their full line positions at which they are in substantial divergence. This opening pressure, as thus applied, causes an arcuate bowing of the resilient cross-member 11 and places it under substantial tension.

While the clip is held in the hand with the leg portions 10—10 thereof in divergence, their sharpened outer portions 14 are passed through the skin of the fowl at opposite sides of the incision which is to be stitched or closed and the clip pushed into the fowl as indicated in Fig. 4. Then the clip opening pressure as applied to the looped portions 13—13, is relieved and the legs are caused under the straightening tendency of the cross-member 11, to spring back to their converging relationship of Fig. 1. Due to the fact that the clip legs 10—10 cannot spread apart, because of the bending of the ends of the cross member 11 thereover, as at the bends 12—12, their movement back to convergence causes the skin along opposite sides of the incision to be drawn together and the clip then operates to hold the incision closed. As the legs 10—10 move to this converging relationship, they also operate to draw the clip inwardly until the cross-member 112 is thus pressed against the fowl. The tension of the cross-member and converging relationship of the legs holds the clip in place.

In Fig. 5, I have illustrated an alternative form of clip. This is like the clip previously described in its purpose and mode of use and comprises the same parts. It differs only in the specific form of the leg joining cross-member which, in this view, is designated by reference numeral 11a. It is shown to be formed between its ends into an open loop 11x. The loop adds length to the wire as used in forming the transverse connection and thus provides greater resiliency without loss of necessary tension. In this view, I have shown the legs 10—10 as being in cross relationship at their inner ends when in normal position, and this crossing of the legs is an aid in maintaining the clip in position after being applied to the fowl.

By use of one or more of such clips of either form illustrated, as may be required, the incision will be held closed. To remove the clips, it is only necessary to grasp the outer ends of the legs and pull them out of the fowl. Such clips may be used indefinitely.

Devices of this kind may be made in various sizes and of wires of various gauge and kind, and it is not the intent that the claims shall be restricted as to size or material.

What I claim as new is:

1. An incision closing clip formed from a single piece of stiff spring wire that terminates at its opposite ends as straight, laterally spaced and normally converging first and second leg portions, said wire being sharpened at its ends, thus to provide the free outer end of each leg portion with a flesh piercing point, said wire as continuing from the outer end of said first leg portion being bent into a first reversely curved loop extending below and toward the free end of said first leg at the outside thereof and intermediate its ends extending above said first leg and being bent substantially at right angle to the plane of the loop and across the top of said first leg and continuing therefrom across said clip as a transverse connector for said first and second leg portions, then extending across the top of said second leg portion between its ends and there bent at a right angle to extend along and below the second leg portion rearwardly from its pointed end and formed into a second reversely curved loop, and the second leg portion extending from said second loop toward and adjacent the free end of said first leg portion.

2. An incision closing clip as in claim 1 including a loop formed in said transverse connector intermediate said legs.

References Cited in the file of this patent

UNITED STATES PATENTS

| | | |
|---|---|---|
| 115,633 | Newton | June 6, 1871 |
| 565,255 | Belden | Aug. 4, 1896 |
| 652,796 | Mackey | July 3, 1900 |
| 865,956 | Sponsel | Sept. 10, 1907 |
| 1,242,804 | Hillman | Oct. 9, 1917 |
| 1,645,500 | Fenton | Oct. 11, 1927 |